United States Patent
Popp et al.

(10) Patent No.: US 6,567,733 B2
(45) Date of Patent: May 20, 2003

(54) CONTROL METHOD FOR AN AUTOMATIC TRANSMISSION

(75) Inventors: Christian Popp, Kressbronn (DE); Hansjörg Rosi, Meckenbeuren (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/909,252

(22) Filed: Jul. 19, 2001

(65) Prior Publication Data

US 2002/0016234 A1 Feb. 7, 2002

(30) Foreign Application Priority Data

Jul. 27, 2000 (DE) .......................................... 100 36 510

(51) Int. Cl.[7] ................................................. G06F 7/00

(52) U.S. Cl. ........................................................ 701/51

(58) Field of Search .............................. 701/51; 477/34

(56) References Cited

U.S. PATENT DOCUMENTS

| 6,101,438 A | | 8/2000 | Staiger et al. ................. 701/55 |
| 6,125,321 A | * | 9/2000 | Tabata et al. ................. 701/97 |

FOREIGN PATENT DOCUMENTS

DE 195 46 292 A1 6/1997 ........... F16H/61/06

* cited by examiner

*Primary Examiner*—Yonel Beaulieu
(74) *Attorney, Agent, or Firm*—Davis & Bujold, P.L.L.C.

(57) ABSTRACT

A method of operating an automatic transmission of a motor vehicle having a hydraulic system, an electronic control unit connected with the hydraulic system and at least one engageable shifting element which is controlled according to a predetermined time-pressure profile. The method comprising the steps storing an associated profile representative of the operating point of the shifting element with regard to at least one of a filling ratio and a position of one piston of the shifting element. Thereafter, calculating an actual operating point of the shifting element via an algorithm stored in the electronic control unit. Finally, controlling the shifting element by the electronic control unit, via the hydraulic system, based on the calculated actual operating point of the shifting element.

16 Claims, 2 Drawing Sheets

CONTROL METHOD FOR AN AUTOMATIC TRANSMISSION

BACKGROUND OF THE INVENTION

In the automatic transmission for motor vehicles known from the prior art, shifting elements and clutches or brakes for adjusting a certain reduction ratio of the automatic transmission are controlled by a hydraulic system with preset time-pressure profiles. The different components of the transmission required for this are coordinated via an electronic unit connected with the hydraulic system which, in accordance with the currently existing operating situation of the motor vehicle and eventual directives of the driver's wish, adequately controls a gear shift to obtain a desired shifting quality.

In a customary gear shift, especially with an engaging shifting element or an engaging clutch, a time-pressure profile can be divided in a filling phase and a shifting phase, it being, in turn, possible to subdivide the filling phase in a rapid filling phase and a filling equalization phase. The shifting phase, which follows the filling phase of the shifting element, constitutes the range of a time-pressure profile of an engaging shifting element in which the shifting element is loaded, via a pressure ramp, with a differential pressure until reaching a pressure outside a gear shift which leads to transmission of a required or desired torque of the shifting element.

In order to satisfy the constantly increasing requirements on the functionality of the automatic transmission, the same as the efforts to increase the comfort in shifting, it has for that purpose been changed over to increasing the number of gears to be shifted and to provide a more compact design of the transmissions. Especially the high number of gear steps of the transmissions results in a shifting element or a clutch is often used to shift different gears.

To improve the variability and spontaneity of the automatic transmissions, it has, in addition, been generally provided that a driver can manually engage in the shifting behavior and thus in preset shifting sequences of an automatic transmission. Besides, in the electric control unit shifting strategies are usually deposited which allow the discontinuation or cancellation of gear shifts in certain operating and driving situations.

The steps result, however, in that an engagement and disengagement of the clutches at the right moment, that is, without impairing the driving comfort or the shifting quality, become increasingly difficult. It is, in particular, problematic, for example, when a clutch with too low filling is shifting in a power flow of a driving train of the motor vehicle. At such an operating point, the clutch is still not capable of transmitting the required or desired torque. After its engagement, if the clutch attains its full transmission capacity, this can be detected by a so-called shifting jerk which must be prevented, on one hand, because of a desired shifting quality and on the other, because of a considerable overload of the clutch. On the contrary, if a clutch reaches its full capacity before the actually provided moment of its engagement, this leads to an interruption of the acceleration which, likewise, represents an impairment of the driving comfort.

To prevent these disadvantages, there have been provided in the practice prohibition times between two consecutive gear shifts before the termination of which times no gear shift is carried out. Thereby is to be ensured that the shifting elements or clutches reach a well-defined state, namely, filled or drained at which the gear shift can be built up free of problems and without receiving the described phenomena that reduce the shifting quality. Besides, to circumvent the above mentioned problems, a discontinuation or a cancellation of gear shifts, that is, the removal of the control pressure on the shifting element in the shifting preparatory or shifting phase, often is not allowed or is allowed only very limitedly so that the shifting operations already introduced have to be carried out first before the start of another gear shift.

It is disadvantageous here that a desired spontaneity of the automatic transmission or of the motor vehicle often cannot be obtained in the driving operation and, in particular, in the case of a driver's desired directions such as "kickdown" following a discontinued overtaking operation related to an introduced downshift operation, the desired or required output torque is not immediately available.

The problem on which this invention is based is to make available a method for operating an automatic transmission with which a high spontaneity can be achieved without damages to a desired shifting quality.

SUMMARY OF THE INVENTION

With the inventive method, via an algorithm stored in the electronic control unit, it is now possible to determine an actual operation point of the shifting element concerned as function of a time-pressure profile according to which a shifting element has last been controlled and of an associated profile representative of the operative point of the shifting element with regard to a filling ratio and/or a position of a piston of the shifting element.

Thereby is created a kind of filling level indicator or filling pattern which offers the advantage that at every moment in the operation of the automatic transmission the actual state of each shifting element is known. In particular, it is possible in each shifting element to automatically determine during engagement the right filling time and during disengagement the right draining time, wherefrom the possibility results of a precise control adapted to the actual operating point during a shifting operation that follows.

The inventive method especially offers the advantage, in case of a gear shift following a discontinued gear shift in which the same shifting element took part, that the new shifting operation is built up on the actual operating point or operating state of the shifting element and the required control for effecting the second gear shift is carried out spontaneously and without loss of shifting quality with a control pressure suitable to the situation.

The transmission can be very precisely coordinated when a transmission applicator presupposes important physical marginal conditions of the shifting element and control thereof. Thereby is advantageously ensured that the shifting element, for example, at the moment of a desired load take-up of a shifting element, be entirely filled and transmits the required torque. It is conversely ensured that no torque be transmitted any longer at the moment of load delivery when no positive engagement exists.

BRIEF DESCRIPTION OF THE DRAWINGS

Advantages embodiments and developments of the inventive method will now be described, by way of example, with reference to the accompanying drawings in which.

DETAILED DESCRIPTION OF THE INVENTION

Figure 1:
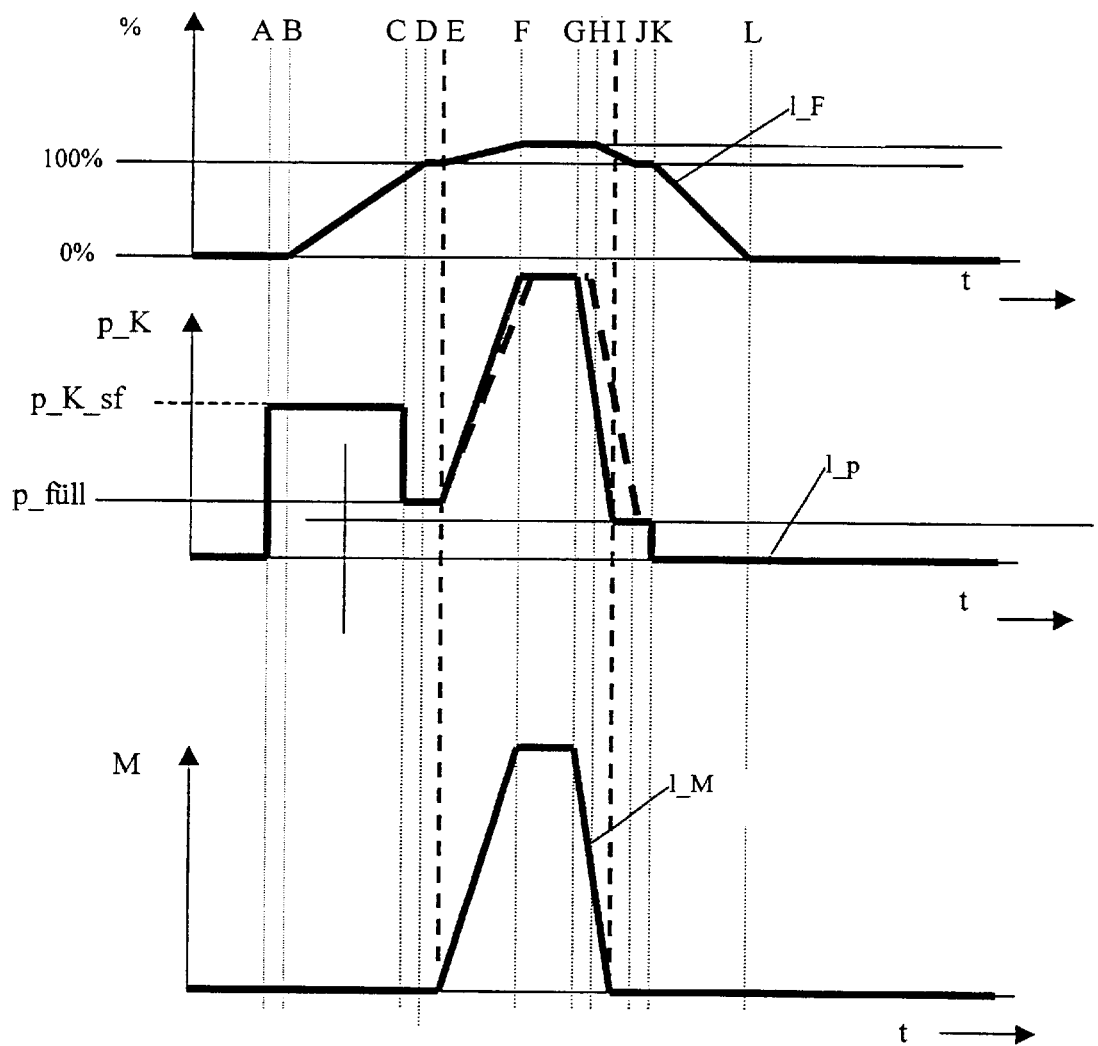
FIG. 1 is an extensively schematized curve of a control pressure of an engaging shifting element and a curve corresponding thereto of a transmitted torque of the shifting element, the same as of a filling ratio or of an operating point of the shifting element.

FIG. 1 shows, by way of example, a curve $1\_F$ of a filling ratio, a curve $1\_p$ of a control pressure $p\_k$ in the course of time t and a curve $1\_M$ of a transmissible torque M of a shifting element formed here as multi-disc clutch of a type known per se during a filling phase, a shifting phase and a consecutive draining phase of the clutch.

The first curve $1\_F$, which shows the filling ratio or a piston position of the clutch corresponding thereto is here function of the time-pressure profile $1\_p$ shown below of the control pressure $p\_K$ of the clutch being examined. Likewise, as function of the curve $1\_p$ of the control pressure $p\_K$ of the clutch stands the curve of the transmissible clutch torque M in the course of time t. All curves represent common, typical operating states taken from the reality of a clutch of an automatic transmission in operation, the curves of the filling ratio or of the position of the clutch and of the transmissible torque M of the clutch being determined at least, in part empirically, and stored in an electronic control unit according to the time-pressure profile of the control pressure $p\_K$.

The curve $1\_F$ of the filling ratio or of a position of a piston of the clutch shown in FIG. 1 is purely by way of example, since the piston of the clutch, according to the control pressure $p\_K$, evidently can also move quicker or slower toward a disc set of the clutch whereby results one other determined curve $1\_F$ of the regulating distance of the piston in the course of time t.

For preparing the data required for the algorithm of the inventive filling pattern, there are preferably established for an "average transmission" representative of a series, typical filling times and the path the piston covers in the course of time. In the "average transmission", the tolerances known from the manufacture are averaged and the geometric parameters resulting therefrom of the separately examined shifting elements and the material values of the separate parts such as a spring constant of the cup spring are made, as reference parameters, the basis of the filling pattern. The divergences from the actual conditions of the clutch or of the transmission which are outside a preset tolerance range can obviously be compensated by adaptations.

According to the most different stored time-pressure profiles $1\_p$ of the control pressure $p\_K$, it is then possible to determined the actual operating state of the clutch and make it the basis for a future control of the clutch with a time-pressure profile of the control pressure preset according to situation by the algorithm of the electronic control unit.

Described below are the different operation phases or separate operating states of one clutch in relation to the time-pressure profile $1\_p$ of the control pressure $p\_K$ shown in FIG. 1.

The points A to L specified in FIG. 1 represent salient points during the filling or shifting preparatory process of the shifting operation and of the draining operation of the clutch.

The point A reproduces the starting position of a drained clutch of an automatic transmission having a filling ratio equal to 0%. Starting from point A, the clutch is loaded with a rapid filling pressure $p\_k\_sf$, still no torque being transmitted by the clutch at the beginning of this phase. Although in this so-called rapid filling phase the clutch already has been controlled or loaded with pressure by a hydraulic system of the automatic transmission connected with the electronic control unit by signal technology, via the algorithm or the filling pattern of the electronic control unit by signal technology, via the algorithm or the filling pattern of the electronic transmission control, a value of 0% is assumed for the filling ratio of the clutch or the piston stroke covered in correlation with the total height of lift thereof up to point B. With this procedure is taken into account that the system has a certain dead time or reaction time.

In a filling phase following point B, the filling ratio of the clutch is assumed to be steadily rising from the filling pattern, the ascent meaning at the same time a movement of the piston in direction of the disc set of the clutch against, for example, a cup spring tension and a friction force. The friction force can result, for example, from the friction fo an O-ring which can be situated between the piston and a wall of a piston chamber that surrounds it.

During the filling phase of the clutch, the control pressure $p\_K$ or the pressure value thereof has to be set so as to counteract the cup spring tension which the piston is going to adjust in its idle or venting position and to adjust the piston in direction of the disc set. In addition, the control pressure has to overcome the friction force of the O-ring friction.

The cup spring tension and the friction force of the O-ring here depend on different influence parameters such as a temperature of the transmission, the momentary position of the piston, an O-ring extrusion and a texture of the piston surface and of the piston chamber and the quality of the pressure medium. As pressure medium is provided here, an incompressible fluid, such as oil, is taking part in determining the existing operating state of the clutch, temperature of the oil and viscosity dependent thereon.

Knowing the actual conditions or the actual operating states, it is possible at any moment to determine, via the inventive algorithm, which constitutes a filling level indicator, the piston position in percent of the total path of the piston. Alternatively, a direct position indication of the piston over the whole length of path is also possible by the filling pattern shown.

According to the representation in FIG. 1, at a point C, indicative of the end of the rapid filling phase, the control pressure $p\_K$ is taken down from the rapid filling pressure $p\_k\_sf$ to the value of a charge pressure $p\_full$, the movement of the piston in direction of the disc set of the clutch being further assumed before its stops completely. The moment of stoppage of the piston is designated more precisely in FIG. 1 by point D. At this operating point, the piston has reached a desired 100% threshold and abuts on the clutch set, the piston still transmitting no torque worth mentioning. The phase following point C and extending up to point E, which marks the beginning of the shifting phase, is designated as the filling equalization phase where the piston is assumed as idle and the filling as constant.

In the shifting phase following the filling equalization phase, the control pressure $p\_K$ is raised until point F to a safety pressure value outside a gear shift. Only during this phase does the value of torque M, which is transmitted by the clutch, begin linearly to rise up to point F to a maximum value.

As is to be understood from the curve $1\_F$ of the filling ratio or of the position of the piston of the clutch, via the algorithm of the filling level, a theoretical increase of the movement of the piston over the 100% mark is assumed in order to include in the filling pattern elasticities of the clutch. Thereby is taken into account a so-called "inflation" of the clutch during the loading thereof with the safety pressure value. This phase corresponds in FIG. 1 to the curve between points E to J, the full torque being transmitted by the clutch in the range between points F and G.

Point F represents the moment at which the actual shifting operation is terminated, since the clutch has reached the necessary safety pressure value of the control pressure p_K.

At point G, the drain phase of the clutch is already introduced with the consequence that the control pressure p_K again is reduced. Here is provided as dead time, via the algorithm or the filling pattern of the electronic control unit, a certain space of time until the piston of the clutch begins to move from its maximum position back to its idle position. The dead time is shown in the curve of the filling ratio or of the position of the piston by the range between points G and H, wherein the maximum torque M transmissible by the clutch, via the filling pattern, is already assumed to be decreasing again starting from point G. Upon reaching point I, the electronic control unit is directed that no torque M worth mentioning is to be transmitted anymore by the clutch even if, as before, the piston abuts on the disc set of the clutch.

The control pressure p_K is steadily reduced in the phase between points G and I to a value substantially corresponding to the charge pressure p_full or somewhat below it and is held at this value for a brief space of time before being lowered to the original value of the control pressure p_K prior to the filling phase. Thereby a certain dead time in the resetting behavior of the piston is taken into account via the algorithm.

Point K represents the operating state of the clutch in which the pressure value of the control pressure p_K has reached below the charge pressure p_full at zero and the piston of the clutch is moved by the cup spring from the clutch set in direction of its original or idle position. At point L, the piston of the clutch has reached with the 0% limit its original position, the time space between points K and L, depending on different control parameters such as the transmission temperature, the oil viscosity, the cup spring tension and the friction force of the O-ring, the influences of which likewise are taken into account by the algorithm. During draining of the clutch, the friction force of the O-ring, for example, counteracts the cup spring tension whereby the pressure value of the control pressure p_K to be applied diminishes by the value of the friction force.

Based on the accurate knowledge of the actual operating point of the clutch, in case of discontinuation of a gear shift or in case of a cancellation of a gear shift, it is possible with this filling pattern to introduce without problem another consecutive gear shift with an adequate time-pressure profile of the control pressure p_K.

For example, after 130 ms of a rapid filling phase lasting 230 ms and a dead time of 30 ms the filling is discontinued, the algorithm determines that the piston has covered 50% of its maximum or of its total regulating distance. The filling ratio or the regulating distance is then assumed at 50% and departing from this point, it can be determined at what time the clutch has reached its complete filling or at what time it will be completely drained.

The filling pattern that describes the piston position preferably contains also as control parameter the physical marginal conditions of the clutch and the control thereof. At the same time are also taken into consideration, together with the temperature influences and system elasticities already described, especially dead times of the whole system such as the electronic control unit with its current end steps, the clutch and the hydraulic system that controls its current end steps, the clutch and the hydraulic system that controls it, the same as the hydraulic valves thereof. Also included here in determining the actual operating point of the clutch are hystereses of the whole system due, in particular, to the differing value of the friction force of the O-ring during filling and draining of the clutch. In addition, system or manufacturing tolerances can be compensated by suitable adaptations of the time-pressure profile of the control pressure p_K.

It is evident that the number of influence parameters shown for the filling pattern is neither complete nor limiting. In the inventive method, the possibility rather exists, in accordance with a preset excellence of the function for setting the position fo the piston of the clutch and of the filling ratio of the clutch, of also taking into account other parameters or of differently weighting the influence of the parameters. The possibility also exists of letting only a few specific parameters enter in determining the operating state of the clutch.

In a variation of the inventive method it can also be provided that the elasticities of the clutch above the 100% mark of the regulated distance of the piston is filtered out, via a filter algorithm, or is compensated so that the time-pressure profile of the control pressure p_K according to FIG. 1 is reproduced offset in time. Such a procedure is shown with a dotted line in FIG. 1 in the curve of the control pressure p_K. It is thereby presented that the electronic control unit issues an information that the regulated distance of the piston at point I has already reached the 100% mark.

Figure 2:
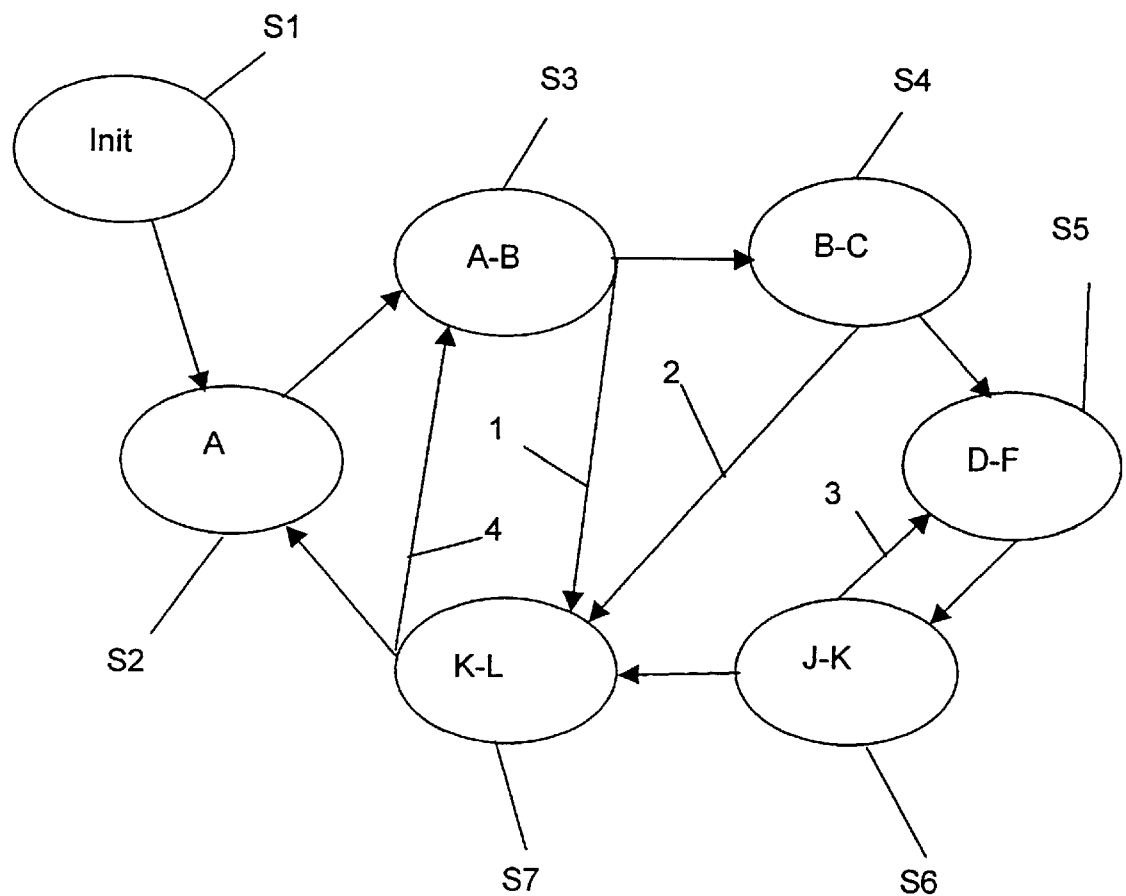
FIG. 2 is a representation of different possible operating states of a shifting element the arrangement of which reproduces the sequence from the beginning of an engagement up to the disengagement of the shifting element.

In FIG. 2 are shown different operating states of the clutch and are reproduced the states which are simulated by the filling pattern or the filling indicator and also correspond to the actual operating states of the clutch in the operation of the automatic transmission.

With state S1 is first reproduced an initialization during which is preset, for example, a zero value of the filling ratio or of the regulating distance of the piston whereby is adjusted the state of an empty clutch whose piston is in idle position. This state of the clutch is reproduced by state S2 and corresponds to the range of the curves of FIG. 1 which lie before point A from the point of view of time.

In a transition from state S2 to a state S3, which represents the range between points A and B of the curves of FIG. 1, the algorithm reproduces a state of the clutch corresponding to the filling of the clutch while the piston is still stationary. A state S4 following the state S3 represents the phase of the curves of FIG. 1 between points B and C during which the clutch is filled and the filling ratio of the clutch or regulated distance of the clutch increases.

The operating state of the clutch shown by a state S5 corresponds to the range of the curves of FIG. 1 between points D and J, the clutch being full in this range and the filling ratio or the piston regulating distance having a value of at least 100%. A state S6 that follows is representative of the range of the curves of FIG. 1 between points J and K in which the clutch is drained and the piston of the clutch undergoes no change in its position.

In a state S7 which corresponds to the curves of FIG. 1 between points K and L, the clutch is further drained and the piston of the clutch is moved in direction of its idle position. When this is attained, the clutch is again in state 2.

With this cycle is described the progress of a filling process, of a consecutive draining of the clutch and of a power flow take-up lying therebetween in the automatic transmission, which occur during an engagement and a disengagement of the clutch that follow.

The arrows or paths between states S3, S4, S5, S6 and S7, specifically designated with the reference numerals 1 to 4, represent all the intermediate transitions allowed by the algorithm or the filling pattern for increasing the spontaneity and the shifting comfort between the operating states of the clutch.

Contrary to the known method described at the beginning, it is possible here when a discontinuation criterion appears in the range between points A and B of the gear shift, after reaching point B, directly to change over from state S3 to the operating state S7 of the clutch without damages to the shifting quality. The transition is shown in FIG. 2 with the arrow marked with the reference numeral 1.

It is also possible upon a signal for carrying out a gear shift during the operating state S7 of the clutch, directly to change over to the filling phase of state S3 after reaching point L. This intermediate path is specifically marked in FIG. 2 with the arrow below the reference numeral 4. This transition makes possible that the clutch does not have to be completely emptied before a resumption of a filling phase, which would result in a considerable delay or impairments of the spontaneity of the transmission.

In the presence of a discontinuation criterion of the gear shift, there further exists the possibility of changing over from the operating state S4 of the clutch during which the clutch is filled and the piston moved to the disc set of the clutch, directly to state S7. The intermediate path is shown by the arrow specifically marked with the reference numeral 2. The resulting advantage is here that the clutch does not have to traverse states S5 and S6 whereby is achieved a significant increase in the spontaneity of the automatic transmission.

Of a shifting signal occurs during the operating state S6, it is possible, based on the detection of the actual operating point of the clutch via the algorithm, to rebound directly to state S5 of the clutch without impairing the gear shift provided. This rebound is shown by an arrow 3 in FIG. 2.

From the described intermediate paths 1 to 4 of FIG. 2, it again becomes especially clear how spontaneously an automatic transmission can be operated with the inventive method.

Reference Numerals
1, 2, 3, 4 intermediate path
A to L operating points of the clutch
1_F curve of the piston position and if the filling ratio
1_M curve of the transmitted moment
1_p curve of the control pressure
p_k control pressure of a clutch
p_k_sf rapid filling pressure
p_full charge pressure
M transmitted torque
S1 to S7 state
t time

What is claimed is:

1. A method of operating an automatic transmission for a motor vehicle having a hydraulic system, an electronic control unit connected with the hydraulic system and at least one shifting element controllable by the hydraulic system via a preset time-pressure profile, wherein the shifting element is engaged and disengaged according to the time-pressure profile, the method comprising the steps of:

determining an actual operating point of the shifting element, via an algorithm stored in the electronic control unit, according to a time-pressure profile basis of a previous control of the shifting element and an associated profile representative of the operating point of the shifting element based on one of a filling ratio and a position of one piston of the shifting element, and controlling the shifting element based upon the determined actual operating point.

2. The method according to claim 1, further comprising the step of using physical marginal conditions of the shifting element and control thereof as influence parameters in the algorithm for calculating the actual operating point of the shifting element.

3. The method according to claim 2, further comprising the step offering dead times of the hydraulic system and of the electronic control unit as influence parameters for calculating the actual operating point of the shifting element.

4. The method according to claim 2, further comprising the step of using temperature influences of the automatic transmission as influence parameters for determining the actual operating point of the shifting element.

5. The method according to claim 2, further comprising the step of using system elasticities of the shifting element as influence parameters for determining the actual operating point of the shifting element.

6. The method according to claim 2, further comprising the step of using hystereses relative to a behavior of the shifting element, during engagement and disengagement, as influence parameters for determining the actual operating point of the shifting element.

7. The method according to claim 1, further comprising the step of providing a filter algorithm with which at least one of elasticities of the shifting element and dead times of the control of the shifting element are compensated, during operation of the method, when calculating the actual operating point of the shifting element.

8. The method according to claim 1, further comprising the step of compensating tolerances of the component parts of the shifting element by defined adaptations.

9. A method of operating an automatic transmission of a motor vehicle having a hydraulic system, an electronic control unit connected with the hydraulic system and at least one shifting element which can be engaged and disengaged by the hydraulic system according to a predetermined time-pressure profile, the method comprising the steps:

storing an associated profile representative of the operating point of the shifting element with regard to at least one of a filling ratio and a position of one piston of the shifting element;

calculating an actual operating point of the shifting element via an algorithm stored in the electronic control unit; and controlling the shifting element by the electronic control unit, via the hydraulic system, based on the calculated actual operating point of the shifting element.

10. The method according to claim 9, further comprising the step of using physical marginal conditions of the shifting element and control thereof as influence parameters in the algorithm for calculating the actual operating point of the shifting element.

11. The method according to claim 10, further comprising the step of using dead times of the hydraulic system and of the electronic control unit as influence parameters for calculating the actual operating point of the shifting element.

12. The method according to claim 10, further comprising the step of using temperature influences of the automatic transmission as influence parameters for calculating the actual operating point of the shifting element.

13. The method according to claim 10, further comprising the step of using system elasticities of the shifting element as influence parameters for calculating the actual operating point of the shifting element.

14. The method according to claim 10, further comprising the step of using hystereses relative to a behavior of the shifting element, during engagement and disengagement, as influence parameters For calculating the actual operating point of the shifting element.

15. The method according to claim 9, further comprising the step of providing a filter algorithm with which at least one of elasticities of the shifting element and dead times of the control of the shifting element are compensated, during operation of the method, when calculating the actual operation point of the shifting element.

16. The method according to claim 9, further comprising the step of compensating for tolerances of the component parts of the shifting element by defined adaptations.

* * * * *